United States Patent [19]

Rosenquist

[11] Patent Number: 4,814,395
[45] Date of Patent: Mar. 21, 1989

[54] ESTER TERMINATED POLYCARBONATES

[75] Inventor: Niles R. Rosenquist, Evansville, Ind.

[73] Assignee: General Electric Company, Mt. Vernon, Ind.

[21] Appl. No.: 132,440

[22] Filed: Dec. 14, 1987

[51] Int. Cl.[4] ............................................. C08L 77/00
[52] U.S. Cl. .................................... 525/433; 525/403; 525/439; 525/453; 525/462; 525/466; 528/176; 528/182; 528/196
[58] Field of Search ....................... 528/176, 196, 182; 525/433, 439, 403, 453, 462, 466; 558/268, 270

[56] References Cited

U.S. PATENT DOCUMENTS 4,358,563 11/1982 Quinn .................................. 525/146
4,556,704 12/1985 Rosenquist ......................... 528/196
4,699,971 10/1987 Mark .................................. 528/198

*Primary Examiner*—Theodore E. Pertilla

*Attorney, Agent, or Firm*—Joseph T. Eisele; Martin B. Barancik

[57] ABSTRACT

A method for the preparation of polycarbonate resins bearing terminal ester groups comprises the interfacial polymerization of a dihydric phenol with a carbonyl halide in the presence of a molecular weight controlling proportion of a compound of the formula:

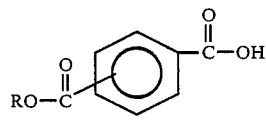

wherein R represents a hydrocarbyl group amenable to beta-elimination upon thermolytic degradation. The product resins are useful as intermediates in the preparation of copolymers with, for example, polyamides.

3 Claims, No Drawings

ESTER TERMINATED POLYCARBONATES

BACKGROUND OF THE INVENTION

1. Field of the Invention

The invention relates to polycarbonate resins and more particularly to polycarbonate resins with a polymer chain terminated ester group, their method of preparation and use in preparation of polycarbonate resins with hydroxyl terminal groups.

2. Brief Description of the Prior Art

Although not prior art to the present invention, hydroxyl polycarbonate resins and their method of preparation are described in the now copending U.S. patent application Ser. No. 939,391 filed on Dec. 8, 1986, now U.S. Pat. No. 3,732,934, by Pyles, Longely and Hathaway. The method of preparation entails the use of a mono protected bishydroxyl compound such as shown in the formula (I), below, wherein R' represents alkylene or arylene, as the chain terminating agent in the preparation of the resins, followed by removal of the protecting group to generate a hydroxyl-terminated polycarbonate resin

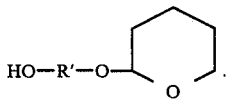
(I)

These hydroxy terminated resins were subsequently converted via reaction at the hydroxy group to reactive end group resins useful in polymer blend and copolymer preparation. Other hydroxyl-terminated polycarbonates were also known prior to the present invention. However, hydroxyl group terminated polycarbonate resins are generally difficult to prepare, especially when made directly in the convenient and well known interfacial polymerization reaction. The difficulty arises because conventionally in this technique it is most convenient to react an equivalent excess of carbonyl halide with a bisphenol and a mono-functional chain terminating agent. However, to produce hydroxyl terminated resin directly in this process, the chain terminating agent would be deleted and slightly less than an equivalent of carbonyl halide would be needed. Because of difficulties of controlling carbonyl halide addition rates and of controlling its losses to side reactions and volatilization, this leads to difficulties in controlling the hydroxyl end group levels and the resin molecular weight.

The method of the present invention permits one to prepare polycarbonate resins having monoester terminal groups, from an interfacial polymerization. The polymers obtained have end group structures which are useful to prepare hydroxyl group terminated polycarbonates, which in turn can be used in the preparation of a wide range of funtionalized polycarbonate resins and polycarbonate resin copolymers.

SUMMARY OF THE INVENTION

The invention comprises a method of preparing a polycarbonate resin having polymer chains terminated with an ester group, which comprises;

reacting a dihydric phenol with a carbonyl halide under interfacial polymerization conditions, in the presence of a molecular weight controlling proportion of a compound of the formula:

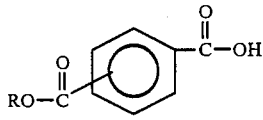
(II)

wherein R represents a hydrocarbyl group amenable to beta-elimination upon thermolysis. Preferably R represents an alkyl or a cycloalkyl group amenable to removal by thermal degradation.

The invention also comprises the product of the method of preparation described above, the product of thermolysis and their uses in functionalized polycarbonate resin and copolymer preparations.

The term "hydrocarbyl" as used herein means the monovalent moiety obtained upon removal of a hydrogen atom from a parent hydrocarbon. Representative of aliphatic hydrocarbyl are alkyl of 1 to 9 carbon atoms, inclusive such as methyl, ethyl, propyl, butyl, pentyl, hexyl, heptyl, octyl, nonyl and isomers thereof; cycloalkyl of 3 to 8 carbon atoms, inclusive, such as cyclopropyl, cyclobutyl, cyclopentyl, cyclohexyl, cycloheptyl, cyclooctyl; alkyl substituted cycloalkyl of 4 to 12 carbon atoms, inclusive, such as 2-methylcyclopropyl, 3,4-dimethylcyclohexyl; alkenyl of 3 to 9 carbon atoms, inclusive, such as 3-hexenyl and aralkyl of 7 to 10 carbon atoms, inclusive, such as phenethyl, phenpropyl, phenbutyl and the like. Preferred hydrocarbyl groups have a hydrogen atom on the carbon beta to the oxa atom in the structure of formula (II), for example isopropyl and cyclohexyl.

DETAILED DESCRIPTION OF THE PREFERRED EMBODIMENTS OF THE INVENTION

Polycarbonate resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the phenol reactants in a suitable water immiscible solvent medium and contacting the reactants with the carbonate precursor, such as phosgene, in the presence of a suitable catalyst and an aqueous caustic solution under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. the temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

Dihydric phenol reactants employed to prepare the polycarbonate resins of the invention are generally well known compounds as are methods of their preparation. Representative of such dihydric phenols are phenolic diols of the general formula:

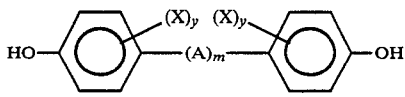
(III)

wherein A is selected from the group consisting of a divalent hydrocarbon radical containing from 1 to about 15 carbon atoms; a halogen substituted divalent hydrocarbon radical containing from 1 to about 15 carbon atoms and divalent groups such as:

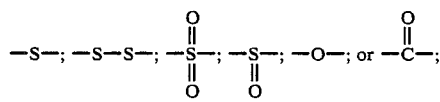

Each X in formula (III) is independently selected from the group consisting of halogen, hydrocarbyl such as an alkyl group of from 1 to about 8 carbon atoms; an aryl group of from 6-18 carbon atoms, an aralkyl group of from 7 to about 14 carbon atoms, an oxyalkyl group of from 1 to about 8 carbon atoms, and an oxyaryl group of from 6 to 19 carbon atoms; and wherein m is zero or 1 and y is a whole number integer of from 0 to 4, inclusive.

Typical of some of the dihydric phenols that are advantageously employed are bis-phenols such as bis(4-hydroxyphenyl)methane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane; dihydric phenyl ethers such as bis(4-hydroxyphenyl)ether, bis(3,5-dichloro-4-hydroxyphenyl)ether; dihydroxydiphenols such as p,p'-dihydroxybiphenyl, 3,3'-dichloro-4,4'-dihydroxybiphenyl; dihydroxyaryl sulfones such as bis(4-hydroxyphenyl)sulfone, bis(3,5-dimethyl-4-hydroxyphenyl)sulfone; dihydroxy benzenes such as resorcinol and hydroquinone: halo- and alkyl-substituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl)sulfide and bis(4-hydroxyphenyl)sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with a glycol.

Preferred dihydric phenols of Formula (III) are the 4,4'-bisphenols.

The carbonate precursor employed in the preparation of resins of the present invention may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,3-bis(4-hydroxyphenyl)propane, hydroquinone, and the like; or the bischloroformates of glycols such as the bischloroformates of ethylene glycol, neopentylene glycol, polyethylene glycol, and the like. Typical of the diarylcarbonates which may be employed are diphenyl carbonate, and the di(alkylphenyl)-carbonates such as di(tolyl)carbonate. Some other non-limiting illustrative examples of suitable diarylcarbonates include di(napthyl)carbonate, phenyl tolyl carbonate, and the like.

The preferred carbonate precursors are the carbonyl halides, with carbonyl chloride, also know as phosgene, being the preferred carbonyl halide.

The term "polycarbonate" as used herein is inclusive of copolyester-polycarbonates, i.e.; resins which contain in addition to recurring polycarbonate chain units of the formula:

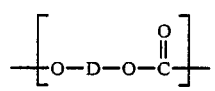

wherein D is a divalent aromatic radical of the dihydric phenol employed in the polymerization reaction, repeating or recurring carboxylate units, for example of the formula:

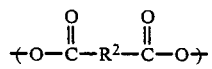

wherein $R^2$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a difunctional carboxylic acid (ester precursor) in the water immiscible solvent.

In general, any difunctional carboxylic acid (dicarboxylic acid) conventionally used in the preparation of linear polyesters may be utilized in the preparation of the copolyester-carbonate resins of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

$$R^1 \text{\textemdash}(R^2)_q\text{COOH} \qquad (IV)$$

wherein $R^2$ is an alkylene, alkylidene, or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^1$ is either a carboxyl or a hydroxyl group. The letter q represents the integer one where $R^1$ is a hydroxyl group and either zero or one where $R^1$ is a carboxyl group.

Preferred difunctional carboxylic acids employed are the aromatic dicarboxylic acids. particularly useful aromatic dicarboxylic acids are those represented by the general formula:

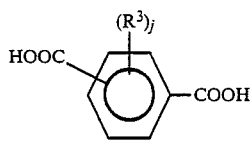 (V)

wherein j is a positive whole integer having a value of from 0 to 4 inclusive; and each $R^3$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred as aromatic dicarboxylic acids are isophthalic acid, terephthalic acids, and mixtures thereof.

Rather than utilizing the difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

Also included within the scope of the instant invention are randomly branched polycarbonate resins wherein a minor amount (typically between 0.05 and 2 mole percent, based on the quantity of dihydric phenol used) of a polyfunctional aromatic compound is a coreactant with the dihydric phenol in the reaction mixture, comprising also the carbonate precursor and optionally the ester precursor; to provide a thermoplastic randomly branched polycarbonate. These polyfunctional aromatic compounds may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making randomly branched polycarbonates are disclosed in U.S. Pat. Nos. 3,635.895 and 4,001,184, both of which are incorporated herein by reference.

In the conventional interfacial polymerization methods of preparing polycarbonates, a molecular weight regulator (a chain stopper) is generally added to the reaction mixture prior to or during the contacting with a carbonate precursor. Useful molecular weight regulators include, but are not limited to, monohydric phenols such as phenol, chroman-I, paratertiarybutylphenyl, P-cumylphenol and the like. Techniques for the control of molecular weight are well known in the art and are used for controlling the molecular weight of the resins of the present invention.

The method of the present invention departs from the conventional interfacial polymerization methods for preparing polycarbonates by the use of a novel chain stopper. Employed as the sole chain stopper, or in combination with one or more of the aforementioned known chain stoppers is an ester compound of the formula:

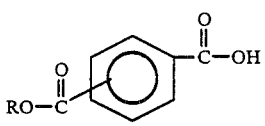 (II)

wherein R is defined above. The proportion of compound (II) added to the reaction mixture may vary but is generally within the range of from 0.5 to 25 percent by weight of the dihydroxy phenol reactant.

The compounds of the formula (II) are generally well known as are methods of their preparation. In general, the compounds of formula (II) may be prepared by the partial esterification of the corresponding dicarboxylic acid of formula (V) given above wherein J is O, to obtain the half-ester. Esterification is with an alcohol of the formula:

R—OH (VI)

wherein R is as defined previously.

Those compounds (II) wherein the ring substituents are in positions ortho to each other may also be prepared by reaction of phthalic anhydride with an equimolar proportion of an alcohol of the formula (VI). The reaction may be carried out by mixing stoichiometric proportions of the reactants and heating the mixture, preferably to a temperature of circa 100° C. to 200° C. either neat or in the presence of an inert organic solvent. The term "inert organic solvent" as used herein means an organic solvent for the reactants which does not enter into reaction with the reactants or adversely affect the desired course of the reaction. Representative of inert organic solvents are methyl ethyl ketone, methyl isobutyl ketone and the like. The general method is described in U.S. Pat. No. 3,578,638.

The alcohols of the formula (VI) are well known. Repesentative of the alcohols of the formula (VI) are ethanol, isopropanol, hexanol, cyclohexanol, phenethyl alcohol and the like.

Those skilled in the art will appreciate from the description given above, that the polycarbonate resins of the present invention may be represented by the schematic formula:

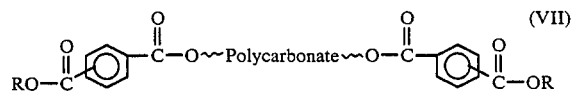 (VII)

wherein R has the meaning previously ascribed to it. The end-capped polycarbonate resins of the formula (VII) are useful as intermediates for carboxylic acid terminated polycarbonate resins, useful in the preparation of polycarbonate block copolymers. These uses of the resins of formula (VII) are brought about by the thermal degradation of the resins (VII) to obtain a further intermediate (transitory) polymer wherein R in the formula (VII) represents hydrogen. Thus, the polycarbonate of the present invention end-capped with the compounds of formula (II) given above are converted to intermediate transitory resins of the invention by thermal degradation, i.e.; exposure to temperatures of 100° to 350° C., preferably 200° to 300° C. for a period of time sufficient to effect removal of the R group (generally 5 to 60 minutes). Under the conditions of the thermolytic degradation to remove the R groups, carboxyl groups are formed. The active carboxyl group may immediately react with an adjacent polycarbonate resin chain. This is believed with a carbonate or ester functional group in a repeat unit of an adjacent resin chain. This exchange reaction results in the conversion of the CO$_2$H group to an ester group and the generation of new hydroxyl end groups derived from the original carbonate or ester functional group. Thus, the present invention also includes resins of the schematic formula:

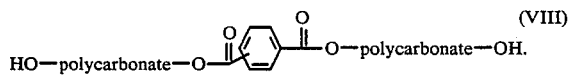
(VIII)

A catalytic proportion of a transesterification catalyst may be present to promote the exchange. A catalytic proportion is generally one within the range of from about 0.00001 to 0.01 parts by weight of the resin composition. Useful transesterification catalysts are basic catalysts conventionally employed in transesterification reactions. Representative of such catalysts are oxides, hydrides, hydroxides or amides of alkali or alkaline earth metals such as, for example, lithium hydroxide and the like. Also, basic metal oxides such as zinc oxide, and the like. Also representative of transesterification catalysts are salts of weak acids such as lithium stearate; organo-titanium catalysts such as tetraoctyltitanate; organotin catalysts such as dibutyltin oxide; aluminum or boron anion containing catalysts such as those described in U.S. Pat. Nos. 4,330,669 and 4,395,062 and the like.

The resins so obtained may be used in the preparation of functionalized polycarbonate resins and block copolymers with a wide variety of thermoplastic resins (such as polyamides, polyesters, polyurethanes and the like).

The polycarbonate resins of the invention described above may have a weight average molecular weight of from about 10,000 to about 200,000, preferably from about 30,000 to about 150,000 and an intrinsic viscosity, as measured in methylene chloride at 25° C., of at least about 0.3 dl/gm, preferably from about 0.45 to about 1.40 dl/gm.

The following examples and preparations describe the manner and process of making and using the invention and set forth the best mode contemplated by the inventor of carrying out the invention but are not to be construed as limiting the invention. where reported, the following tests were carried out:

Intrinsic Viscosity

The intrinsic viscosity was measured at a temperature of 25° C. in methylene chloride and is reported in deciliters/gram (dl/g).

Hydroxyl End Group Analysis

Hydroxyl end group analysis was carried out by infrared absorption analysis at 3584 cm$^{-1}$ using a Nicolet 1705x spectrometer. Hydroxyl levels were calculated with reference to a calibration curve developed by determining the absorbance at 3584 cm$^{-1}$ of solutions of a polycarbonate resin with very low hydroxyl level to which had been added known concentrations of bisphenol-A.

Preparation 1

To a suitable reaction vessel there is charged phthalic anhydride and a 2.0X molar excess of isopropyl alcohol. The charge is heated to reflux temperature for about one hour. At the end of this time period an aliquot of the reaction mixture shows an absence of anhydride by infra-red analysis. The solvent is removed under vacuum and the residue recrystallized from toluene to obtain 1,2-benzene dicarboxylic acid mono-isopropyl ester (M.P. 73°–77° C.).

EXAMPLE 1

A 2000 ml four neck flask was fitted with a mechanical stirrer, a pH probe, aqueous caustic inlet tube and a Claisen adaptor to which was attached a dry ice condenser and a gas inlet tube. To the flask was added 560 ml water, 680 ml methylene chloride, 2.8 ml triethylamine (0.02 mole), 5.65 g (0.025 mole) of the 1,2 benzenedicarboxylic acid mono-isopropyl ester and 114 (0.50 mole) bisphenol-A. With stirring the pH was raised to 10 by addition of 25% aqueous sodium hydroxide, then phosgene was introduced into the flask at 1 g/min for 60 minutes (0.6 mole) with pH maintained at 9.5 to 11.5. The pH was adjusted to 11 at the end of the reaction. The resin layer was separated from the brine layer, then washed with 3 wt. % aqueous HCl until washing remained acidic (usually only one required) then twice with distilled water. The resin was then precipitated into 1500 ml of methanol in a Waring blender, then washed with 500 ml more methanol.

EXAMPLE 2

This example is not an example of the invention but is made for purposes of comparison.

A resin was prepared by substantially the same procedure as used in Example 1, supra., except that phenol, a conventional end-capping agent for polycarbonate resin was used in place of the 1,2 benzenedicarboxylic acid mono isopropyl ester.

EXAMPLE 3

5 gram portions of the resins of Example 1 and comparative Example 2 were placed separately in petri dishes, dried in a 115° C. air circulating oven, then placed in a vacuum oven set at 300° C. and at 5 mm pressure. Samples were removed at 15 minute intervals for a period of one hour (for the first 15 minutes, the oven temperature gradually increased from 285° C. to 300° C.) The intrinsic viscosities and hydroxy end group levels for the samples were determined, with the results given in the Table, below.

TABLE

Results of Vacuum Oven Themolysis of Isopropyl Ester End Group Resin and Conventional End Group Resin.

| Time at 300° C./ 5 mm | Example 1 isopropyl-ester end-capped | | Comparative Example 2 phenol end-capped | |
|---|---|---|---|---|
| | IV | OH end groups (ppm) | IV | OH end groups (ppm) |
| 0 | 0.436 | 270 | 0.443 | less than 20 |
| 15 | 0.404 | 795 | 0.456 | 25 |
| 30 | 0.387 | 1590 | 0.437 | 40 |
| 45 | 0.462 | 2150 | 0.456 | 54 |
| 60 | 0.486 | 2230 | 0.440 | 53 |

As shown in the table, rapid formation of hydroxy end groups in the resin under the reaction conditions for the resin of Example 1 and negligible formation of hydroxy end groups from the comparative example occurs. At the 60 minute reaction time, the 2230 ppm of OH groups corresponds to about 3.3 moles of OH groups for every 100 repeat units in the resin, i.e.; 3.3 mole % hydroxy end groups. Since polycarbonate resin of the intrinsic viscosity of that sample (0.486) typically contains 3.5 to 4.0 mole % end groups, this indicates substantially complete formation of the hydroxy end groups.

The polycarbonate resins of the invention having the formula (VII or VIII) given above may be used in the preparation of block copolymers, with a wide variety of reactive, synthetic polymers (for example polyamides, polycarbonates, polyester, polyurethanes, polyethers and the like). Generally this is accomplished by first reacting the hydroxyl or carboxyl terminal groups of the resins with appropriate functionalizing agents. For example, the resins may be reacted with phosgene or diacid chloride derivatives of diacids (V), with a dihydric phenol of formula (III) also present, to yield novel block polycarbonate or polyester carbonate resins. Alternatively, the hydroxyl terminate resin may be derivitized in the manner described in the above-mentioned U.S. patent application Ser. No. 939,391 and that derivatized resin used to prepare blends with polyamide which are comprised in part of a polycarbonate-polyamide co-polymer, by methods described in the aforementioned application, incorporated herein by reference thereto.

Thus, the resins of the invention may be used in the preparation of functionalized polycarbonate resins and block copolymers with a wide variety of thermoplastic resins such as polyamide, polyester, polyurethane and the like.

What is claimed is:

1. A transitory polycarbonate resin end-capped with a monovalent moiety of the formula:

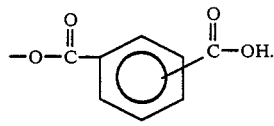

2. A resin of the schematic formula:

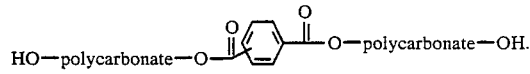

3. A block copolymer prepared by the reaction of the polycarbonate resin of claim 1 with a reactive, synthetic, polymeric resin selected from the group consisting of polyamides, polycarbonates, polyesters, polyurethanes and polyethers.

* * * * *